United States Patent [19]

Fujimoto et al.

[11] Patent Number: 5,676,491

[45] Date of Patent: Oct. 14, 1997

[54] BURIED PIPE LAYING METHOD

[75] Inventors: Tomoya Fujimoto; Toshikazu Masuda; Isamu Miyoshi; Akira Adachi, all of Tokyo, Japan

[73] Assignees: Kawasaki Steel Corporation, Kobe; Kawatetsu Techno-Construction Co., Ltd., Tokyo, both of Japan

[21] Appl. No.: 600,765

[22] Filed: Feb. 13, 1996

[51] Int. Cl.$^6$ .................................................. E03F 3/06
[52] U.S. Cl. .................................... 405/154; 405/156
[58] Field of Search ............................. 405/154, 156, 405/174, 184

[56] References Cited

U.S. PATENT DOCUMENTS

| | | | |
|---|---|---|---|
| 1,372,856 | 3/1921 | Winterbottom | 405/138 |
| 3,645,102 | 2/1972 | Chlumecky | 405/146 |

FOREIGN PATENT DOCUMENTS

| | | |
|---|---|---|
| 0692606 | 7/1995 | France . |
| 1020570 | 8/1963 | United Kingdom . |

*Primary Examiner*—Tamara L. Graysay
*Assistant Examiner*—Tara L. Mayo
*Attorney, Agent, or Firm*—Dvorak & Orum

[57] ABSTRACT

A buried pipe laying method of additionally coupling a new pipe with the extreme end of a buried pipe laid underground involves flatly deforming a cylindrical pipe having a pipe length smaller than the inside diameter of the buried pipe, conveying the deformed cylindrical pipe to the extreme end of the buried pipe laid underground through the interior thereof, and then returning the deformed shape of the cylindrical pipe to its original circular shape and coupling it with the extreme end of the buried pipe.

6 Claims, 6 Drawing Sheets

BURIED PIPE LAYING METHOD

BACKGROUND OF THE INVENTION

1. Field of the Invention

The present invention relates to a buried pipe laying method for shield tunnelling and coupling a new pipe with the extreme end of an already buried pipe already laid underground by excavating earth and sand ahead of the buried pipe.

2. Description of the Related Art

Conventionally, shield tunnelling has been widely employed as a method for laying a pipe underground. Shield tunnelling has many advantages, such as less adverse influences on traffic on surface streets and structures. It generates less noise and vibration and it can be carried out at a deep location, and the like.

In shield tunnelling, earth and sand ahead of a buried pipe already laid underground are excavated for a predetermined distance using an excavating machine disposed at the extreme end of the buried pipe. Earth and sand are removed in a slurry state through the interior of the buried pipe. Thereafter, a plurality of wall segments 21 (refer to FIG. 9), which form a cylindrical short pipe 20 by being connected to each other in a peripheral direction, are conveyed to the extreme end of the buried pipe through the interior of the buried pipe. The segments 21 having been conveyed to the extreme end of the buried pipe are assembled to a cylindrical shape as well as the cylindrical short pipe 20 is coupled with the extreme end of the buried pipe. When the above operation is repeated, the buried pipe, which is composed a plurality of the short pipes 20 coupled with each other in the pipe length direction thereof, is laid underground with each of the short pipes 20 being constructed by assembling a plurality of the segments 21 to a cylindrical shape.

Japanese Patent Application Laid-Open No. 6-137085, for example, discloses a structure using segments which are divided to reduce an amount of deformation of a tunnel for forming a short pipe from a plurality of segments divided as described above.

In the above-described conventional shield tunnelling methods, however, since a plurality of segments are needed to constitute a short pipe, these segments must be successively conveyed through the interior of a buried pipe. To convey the segments is time consuming, and further much time is needed for the assemble of the conveyed segments. Therefore, the conventional shield tunnelling methods are unsatisfactory from the point of efficiency and cost. Further, since a short pipe is composed by assembling a plurality of segments, a problem arises in that there may be a defect in the accuracy of the finished shape of the short pipe and water may leak from portions where a plurality of the segments are joined to each other.

An object of the present invention is to provide a buried pipe laying method which is advantageous in efficiency and cost as compared with conventional method and by which a pipe having the less number of joints can be laid underground.

SUMMARY OF THE INVENTION

To achieve the above object, the present invention provides a buried pipe laying method of additionally coupling a new pipe with the extreme end of a buried pipe laid underground. The method comprises the steps of flatly deforming a cylindrical pipe having a pipe length shorter than the inside diameter of the buried pipe, conveying the deformed cylindrical pipe to the extreme end of the buried pipe laid underground through the interior thereof, and then returning the deformed shape of the cylindrical pipe to its original circular shape, and finally coupling the cylindrical pipe with the extreme end of the buried pipe.

In this method, it is preferable to use a cylindrical pipe having a joint projecting in a direction at one of the pipe ends.

In the above described buried pipe laying method, it is preferable that when the cylindrical pipe is to be flatly deformed, this should be within the elastic deformation limit thereof.

Otherwise, when the cylindrical pipe is flatly deformed, the cylindrical pipe may be plastically deformed. However, the plastic deformation must be effected within a range in which no crack and breakage is caused to the cylindrical pipe.

The buried pipe laying method of the present invention is arranged such that the cylindrical pipe itself is used as a segment without being divided into sections. The pipe is conveyed through the buried pipe after being deformed to an ellipse or a flat shape. Therefore, the structure need not be assembled by into a cylindrical shape using, for example, bolt and nut fasteners. Further, a support is not needed for an assembly job. Further, since the cylindrical pipe itself is used as the segment, the number of joints is reduced, by which the possibility of leakage is reduced.

When a deformable pipe such as a steel pipe, vinyl chloride pipe, polyethylene pipe, fiber reinforced plastic (FRP) pipe or the like is used as the cylindrical. pipe and it is deformed within its elastic deformation limit, the shape of the pipe is returned to its original cylindrical shape only by loosening, for example, a hydraulic jack or the like used to deform the pipe, so that a finished shape can be kept to a pinpoint accuracy. When the cylindrical pipe is plastically deformed, it must be returned to its original cylindrical shape by releasing the hydraulic jack.

Further, when a cylindrical pipe having a joint is used, it can be easily positioned in the coupling thereof with the extreme end of the buried pipe by using the joint as a guide, which contributes to the reduction of a support means. When the cylindrical pipe has the joint, the cylindrical pipe may be coupled with the buried pipe only by being engaged with the extreme end of the buried pipe, depending upon the shape of the joint, the application of the buried pipe, and the like, so that the cylindrical pipe need not be coupled with the buried pipe by welding or the like. Further, when the buried pipe is composed of a plurality of the cylindrical pipe coupled with each other, the joints form increased wall thickness portions which are repeatedly disposed in the lengthwise direction of the buried pipe like bamboo nodes, whereby the rigidity of the buried pipe is increased. The bending strength of the buried pipe against an external force such as a soil pressure or the like is thereby improved.

Figure 4:
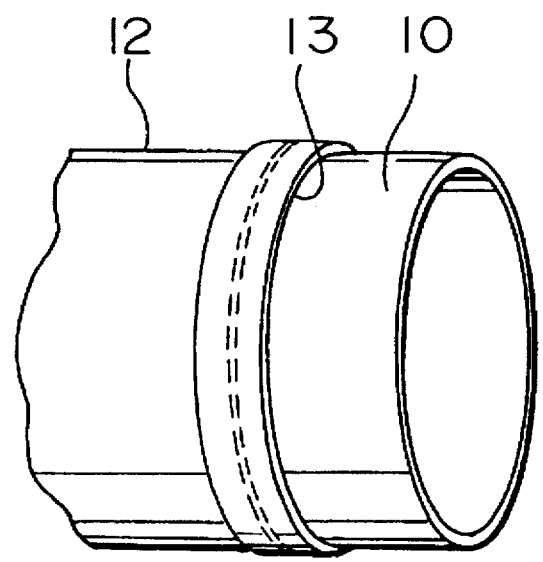
FIG. 4 is a perspective view showing a steel pipe coupled with the extreme end of a buried pipe in another embodiment of the shield tunnelling according to the present invention.
Figure 7:
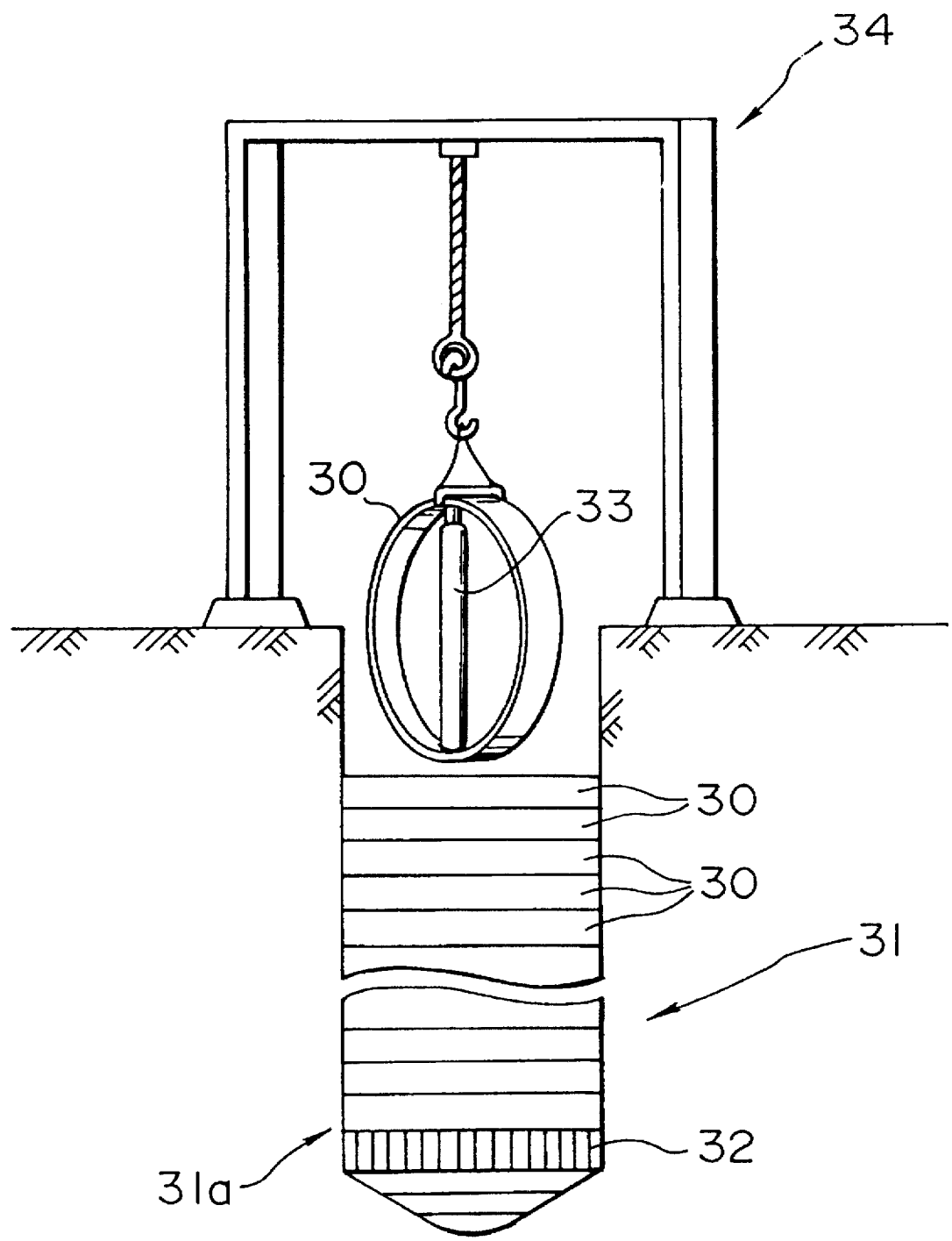
Figure 8:
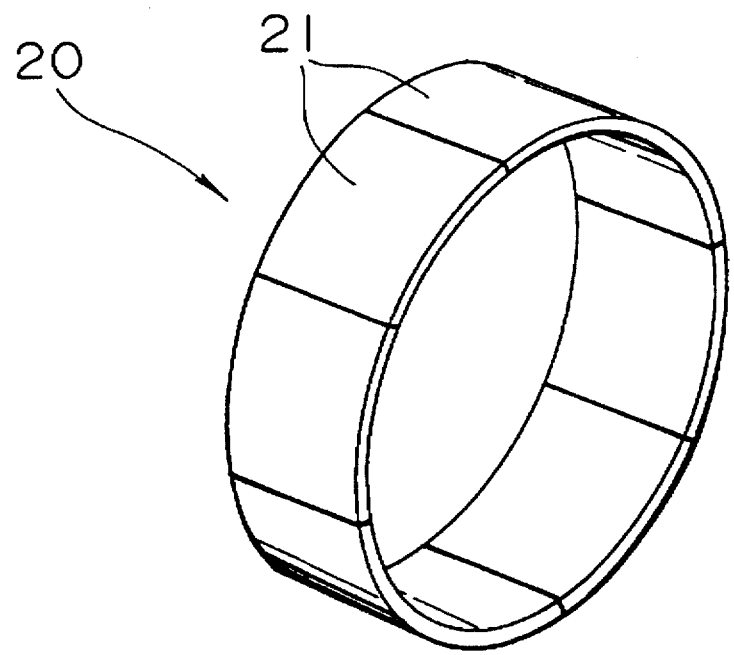
Figure 9:
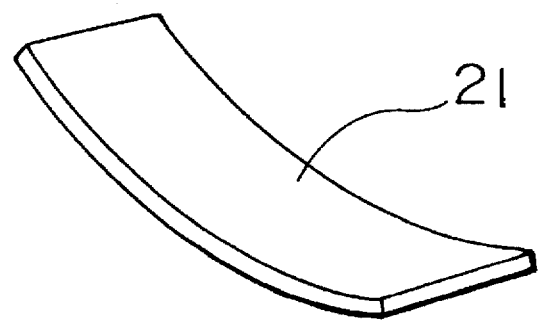

FIG: 6 is a view of a buried pipe composed of a multiplicity of the steel pipes of FIG. 4 coupled with each other;

FIG. 7 is a view showing another example of the shield tunnelling to which the buried pipe laying method according to the present invention is applied;

FIG. 8 is a perspective view of a prior art structure showing a cylindrical short pipe formed by connecting a plurality of segments; and FIG. 9 is a perspective view of one of the segments used in the prior art shown in FIG. 8.

DESCRIPTION OF PREFERRED EMBODIMENT

An embodiment of the present invention will be described below.

Figure 1:
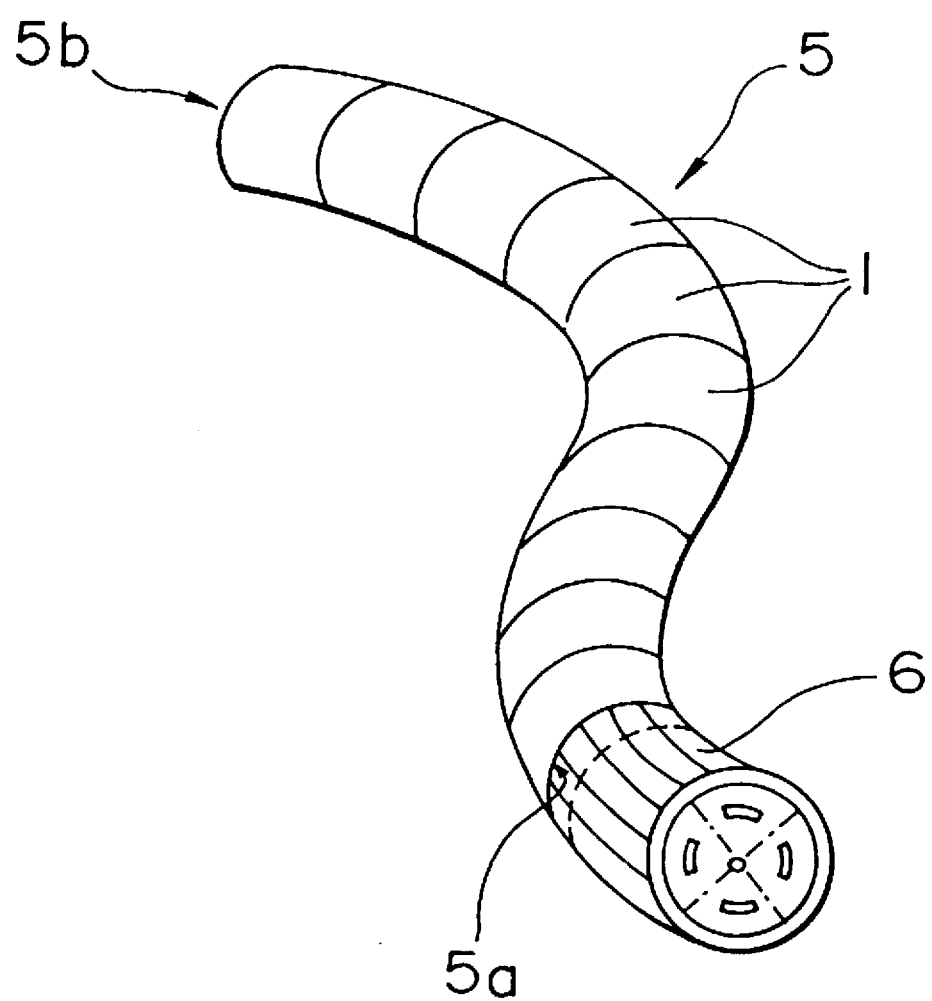
FIG. 1 is a schematic view of a buried pipe laid underground by shield tunnelling to which an embodiment of a buried pipe laying method according to the present invention is applied.
Figure 2A:
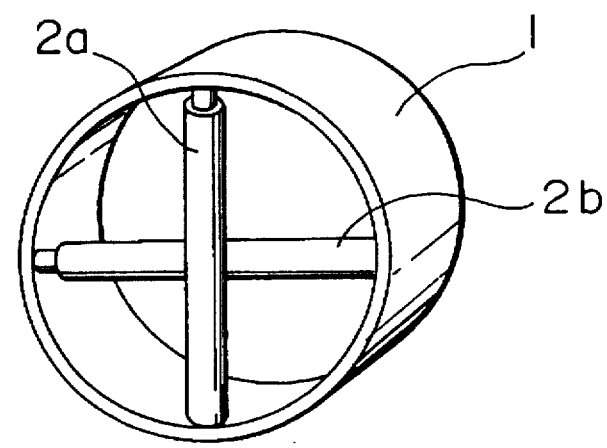
FIGS. 2A, 2B and 2C are schematic views of shield tunnelling to which an embodiment of the buried pipe laying method according to the present invention is applied.
Figure 2B:
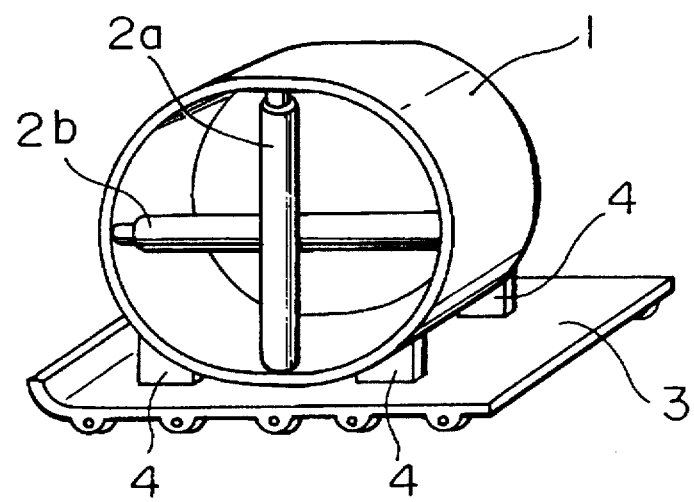
Figure 2C:
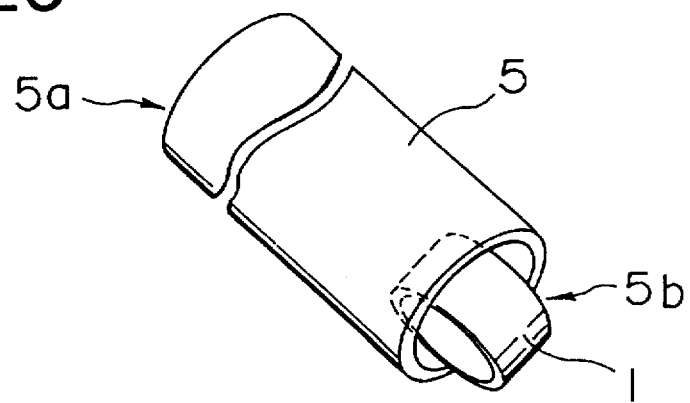
Figure 3:
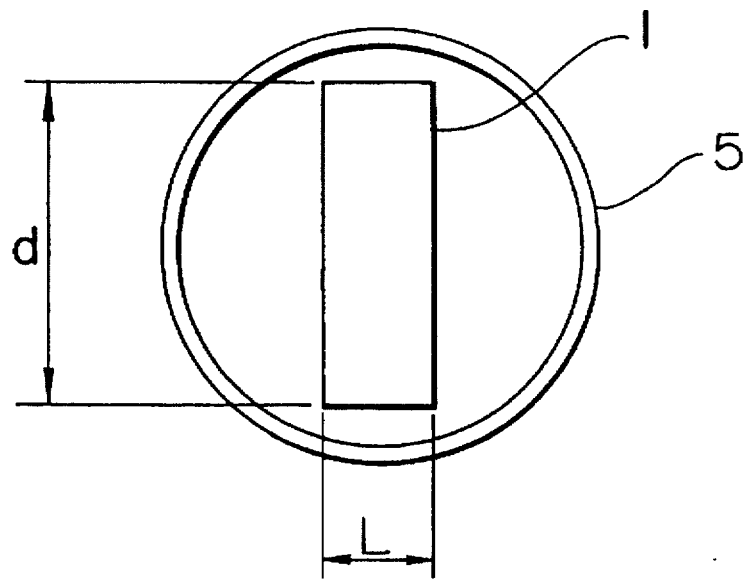
FIG. 3 is a side elevational view showing a state that a deformed cylindrical pipe is conveyed into a buried pipe.

FIG. 1 is a perspective view of a buried pipe laid underground by shield tunnelling to which an embodiment of a buried pipe laying method according to the present invention is applied. FIGS. 2A, 2B and 2C are views of shield tunnelling to which an embodiment of the buried pipe laying method according to the present invention is applied and FIG. 3 is a side elevational view showing the state of a deformed cylindrical pipe which is conveyed into a buried pipe.

As shown in FIG. 1, it is assumed here that a buried pipe 5 composed of cylindrical steel pipes 1 successively coupled with each other is already laid underground in a state that an excavating machine 6 is disposed at the extreme end 5a of the buried pipe 5. The excavating machine 6 excavates the underground using the extreme end 5a of the buried pipe 5 as a reaction force and forms a cavity corresponding to the size of the steel pipe 1 ahead of the extreme end 5a of the buried pipe 5. Earth and sand produced by being excavated by the excavating machine 6 pass through the interior of the buried pipe 5 as, for example, slurry and is exhausted to the outside of the buried pipe 5 from the trailing end 5b of the buried pipe 5.

Next, a new steel pipe 1 is inserted into the cavity ahead of the extreme end 5a of the buried pipe 5 and the thus conveyed steel pipe 1 is coupled with the extreme end 5a of the buried pipe 5.

When the new steel pipe 1 is to be conveyed, hydraulic jacks 2a, 2b are set in the steel pipe 1 and a force is applied to the inside wall surface of the steel pipe 1 by the jacks 2a, 2b to thereby flatly deform the steel pipe 1 within the elastic deformation limit thereof as shown in FIG. 2B. The flatly deformed steel pipe 1 is placed on a low cart 3 and fixed thereto by wedges 4 as shown in FIG. 2B. Then, the steel pipe 1 is conveyed into the buried pipe 5 already laid underground from the trailing end 5b thereof and further conveyed up to the extreme end 5a of the buried pipe 5 through the interior of the buried pipe 5 as shown in FIG. 2C. The position of the steel pipe 1 conveyed ahead of the extreme end 5a of the buried pipe 5 is changed so that the steel pipe 1 communicates with the buried pipe 5 while being returned to its original circular shape by the jacks 2a, 2b being loosened.

The steel pipe 1 the shape of which is returned to the circular shape and the position of which is changed to the same direction as that of the buried pipe 5 as described above is coupled with the extreme end of the buried pipe 5 by, for example, a mechanical seal joint or the like.

When the position of the steel pipe 1 is to be changed after it is conveyed to the extreme end of the buried pipe 5, operation for changing the direction is disturbed by a hose and the like which extend from the excavating machine 6 through the interior of the buried pipe 5 (refer to FIG. 1) to discharge, for example, earth and sand. To cope with this problem, a joint for the hose and the like is provided behind the excavating machine 6, and when the steel pipe 1 is conveyed to the extreme end 5a of the buried pipe 5, the hose and the like are disassembled once at the joint and connected again to the joint after the steel pipe 1 is coupled with the extreme end 5a of the buried pipe 5.

The length of the buried pipe 5 is successively extended by repeating the excavation carried out by the excavating machine 6 and the coupling of the steel pipe 1 with the extreme end 5a of the buried pipe 5.

EXAMPLE

A specific example of the steel pipe 1 in the aforesaid embodiment will be described with reference to FIG. 3. A steel pipe composed of a material in conformity with JIS G3444STK 490 (carbon steel pipe for general structural purpose) having an outside diameter of 1,800 mm, a thickness of 11 mm and a length L of 375 mm is prepared as the steel pipe 1.

When the steel pipe 1 is to be flatly deformed, it is deformed by application of a load of about 1 ton by a hydraulic jack so that a distance d between the outside walls of the steel pipe 1 is set to about 1736 mm in the flatly deformed direction thereof. An amount of diameter reduction of the steel pipe 1 is about 93 mm in this case. The aforesaid deformation of the steel pipe 1 enables it to pass through the interior of the buried pipe 5 as shown in FIG. 3. An amount of deformation of the steel pipe 1 at the time is within the elastic deformation limit thereof.

Figure 5:
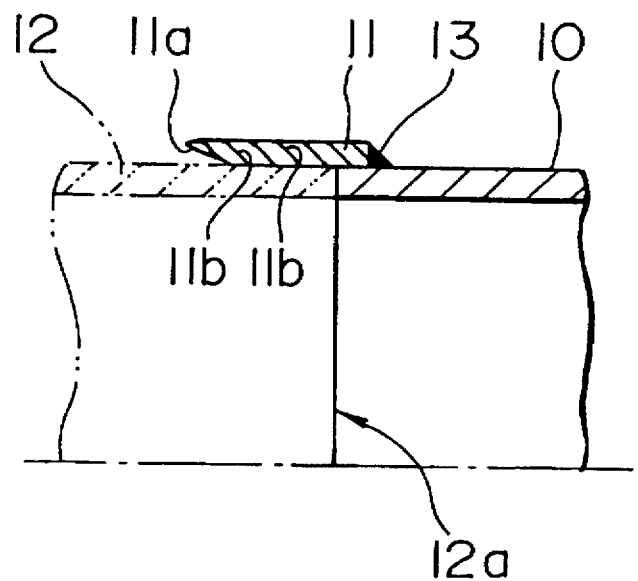
FIG. 5 is a cross sectional view of the steel pipe shown in FIG. 4.

FIG. 4 is a perspective view showing a state that a steel pipe is coupled with the extreme end of a buried pipe in another embodiment of the shield tunnelling according to the present invention. FIG. 5 is a cross sectional view of the steel pipe shown in FIG. 4 and FIG. 6 is a side view of a buried pipe composed of a multiplicity of the steel pipes of FIG. 4 coupled with each other.

A guide ring 11 is fixed to an end of the steel pipe 10 by being welded thereto at a welding seam 13. The guide ring 11 is an example of a joint of the present invention. Since the inner side of the extreme end 11a of the guide ring 11 is formed to a tapered shape, even if a slight dislocation is caused when the steel pipe 10 is coupled with a buried pipe 12 at the extreme end 12a thereof, the dislocation is corrected by the tapered portion so that the steel pipe 10 can be easily coupled with the buried pipe 12. Further, a rubber O-ring 11b attached to the inside wall of the guide ring 11 prevents leakage in a state that the steel pipe 10 is coupled with the buried pipe 12. Although the guide ring 11 is attached to the outside wall of the buried pipe 12 in this example, it may be attached to the inside wall of the buried pipe 12.

Figure 6:
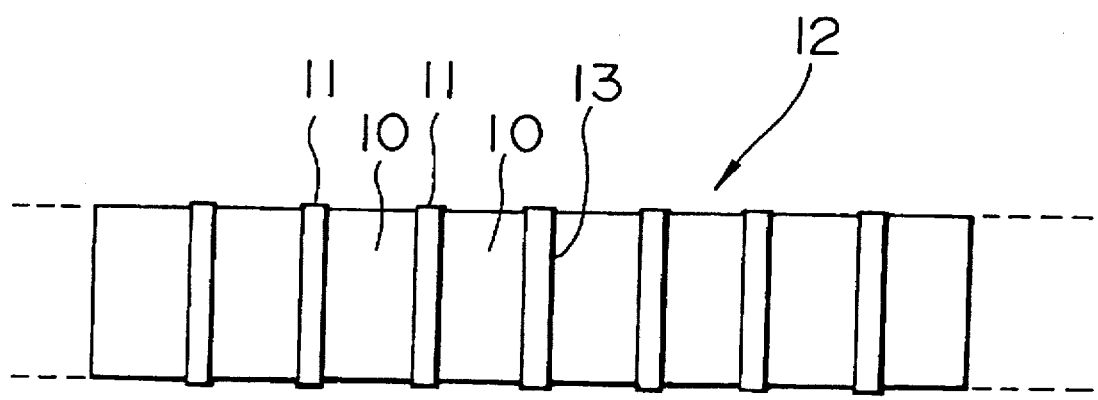

When the buried pipes 12 arranged as described above are successively coupled with each other, the buried pipe 12 having the guide rings 11 disposed like bamboo nodes is formed as shown in FIG. 6. As a result, the guide rings 11 increase the rigidity of the buried pipe 12, by which the bending strength of the buried pipe 12 against an external force such as a soil pressure and the like can be improved.

The buried pipe 12 is composed of steel pipes 10 which are successively coupled with each other mechanically using the guide rings 11 as a guide in the method of construction described with reference to FIG. 4 to FIG. 6. However, the buried pipe 12 itself can be also used as a fluid conveying pipe line by spraying concrete to the inside wall of the buried pipe 12 or lining the inside wall with a chemical sheet, a metal material or the like.

Otherwise, a double-wall pipe may be constructed by using the buried pipe constructed as described above as a sheath pipe and inserting a main pipe therethrough.

FIG. 7 is a view showing another example of shield tunnelling to which the buried pipe laying method of the present invention is applied.

Here, a shaft is formed by a buried pipe 31 composed of a plurality of steel pipes 30 coupled with each other by shield tunnelling and an excavating machine 32 is disposed at the extreme end 31a of the buried pipe 31. When a new steel pipe 30 is to be coupled with the extreme end 31a of the buried pipe 31, the new steel pipe 30 is flatly deformed by a jack 33, suspended by a gate-type crane 34 and conveyed to the extreme end 31a of the buried pipe 31 through the interior thereof.

Although the buried pipe extending in a lateral direction and the buried pipe extending in a vertical direction are described above, the buried pipe may be inclined and a buried pipe extending in any direction can be formed using the present invention.

Although the above embodiment is an example of shield tunnelling to which the present invention is applied, the present invention is not applied only to the shield tunnelling. For example, an old circular concrete tunnel which cannot be used without being repaired can be repaired and reused by successively conveying steel pipes into the tunnel and coupling them with each other by applying the present invention to the tunnel.

Although the steel pipe is used to constitute the buried pipe in the respective examples mentioned above, the present invention is not applied only to the use of steel pipe but is also applicable to a buried pipe composed of a material having flexibility or elasticity such as a vinyl chloride pipe, FRP pipe and the like. Further, the present invention is also applicable when the buried pipe is constructed using a pipe formed of a material which does not cause cracks, breakage and the like and can return to its original circular shape even if it is plastically deformed. Furthermore, a pipe which is bent to avoid an obstacle can be laid as shown in FIG. 1 by adjusting the length of the steel pipe 1 in its lengthwise direction (changing the length thereof in an upward/downward direction or a right to left direction).

As described above, according to the present invention, since each of the cylindrical pipes themselves are constructed as a segment and a buried pipe is laid underground by being composed of the cylindrical pipes coupled with each other successively, the method of the present invention is highly advantageous as compared with the conventional method in efficiency and cost.

What is claimed is:

1. A buried pipe laying method for coupling an additional new pipe with an extreme end of a buried pipe, comprising the steps of:

flatly deforming a cylindrical pipe having a pipe length shorter than the inside diameter of said buried pipe;

conveying said deformed cylindrical pipe to the extreme end of said buried pipe through the interior thereof; and returning the deformed shape of said cylindrical pipe conveyed to the extreme end of said buried pipe to its original circular shape and coupling the cylindrical pipe with the extreme end of the buried pipe.

2. A buried pipe laying method according to claim 1, wherein a cylindrical pipe having a longitudinal joint projecting at one end is used as said cylindrical pipe.

3. A buried pipe laying method according to claim 2, wherein the step of flatly deforming a cylindrical pipe further includes deforming said cylindrical pipe within the elastic deformation limit thereof.

4. A buried pipe laying method according to claim 2, wherein the step of flatly deforming a cylindrical pipe further includes plastically deforming said cylindrical pipe.

5. A buried pipe laying method according to claim 1, wherein the step of flatly deforming a cylindrical pipe further includes deforming said cylindrical pipe within the elastic deformation limit thereof.

6. A buried pipe laying method according to claim 1, wherein the step of flatly deforming a cylindrical pipe further includes plastically deforming said cylindrical pipe.

* * * * *

UNITED STATES PATENT AND TRADEMARK OFFICE
CERTIFICATE OF CORRECTION

PATENT NO. : 5,676,491
DATED : October 14, 1997
INVENTOR(S) : Tomoya Fujimoto, et al.

It is certified that error appears in the above-identified patent and that said Letters Patent is hereby corrected as shown below:

On the title page item [30] Foreign Application Priority Date

--Feb. 24, 1995 [JP] JAPAN ......7-036874--.

Signed and Sealed this

Second Day of February, 1999

Attest:

*Attesting Officer*

*Acting Commissioner of Patents and Trademarks*